US011529785B2

(12) United States Patent
Hirata et al.

(10) Patent No.: US 11,529,785 B2
(45) Date of Patent: Dec. 20, 2022

(54) BOX ASSEMBLY DEVICE AND METHOD OF ASSEMBLING BOX

(71) Applicant: KAWASAKI JUKOGYO KABUSHIKI KAISHA, Kobe (JP)

(72) Inventors: Kazunori Hirata, Yao (JP); Takeshi Hashimoto, Kakogawa (JP); Ippei Nagahiro, Kobe (JP); Hiroshi Katafuchi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 70 days.

(21) Appl. No.: 16/767,241

(22) PCT Filed: Nov. 22, 2018

(86) PCT No.: PCT/JP2018/043256
§ 371 (c)(1),
(2) Date: May 27, 2020

(87) PCT Pub. No.: WO2019/103114
PCT Pub. Date: May 31, 2019

(65) Prior Publication Data
US 2020/0406570 A1 Dec. 31, 2020

(30) Foreign Application Priority Data
Nov. 27, 2017 (JP) ............................. JP2017-227095

(51) Int. Cl.
*B31B 50/36* (2017.01)
*B65D 5/42* (2006.01)
(Continued)

(52) U.S. Cl.
CPC .............. *B31B 50/36* (2017.08); *B31B 50/60* (2017.08); *B65D 5/0236* (2013.01); *B65D 5/4266* (2013.01); *B25J 13/00* (2013.01)

(58) Field of Classification Search
CPC .... B31B 1/26; B31B 3/30; B31B 3/36; B31B 3/42; B31B 3/46; B31B 3/48; B31B 3/60;
(Continued)

(56) References Cited

U.S. PATENT DOCUMENTS

2014/0179501 A1* 6/2014 Akama ................. B31B 50/262
493/162
2015/0356120 A1 12/2015 Igaki
2016/0229571 A1* 8/2016 Hansen .................. B31B 50/07

FOREIGN PATENT DOCUMENTS

CN 103057167 A 4/2013
CN 103895038 A 7/2014
(Continued)

*Primary Examiner* — Andrew M Tecco
*Assistant Examiner* — Jacob A Smith
(74) *Attorney, Agent, or Firm* — Oliff PLC

(57) ABSTRACT

In a box assembly device, a holding mechanism causes one of bottom boards to contact a first jig and folds the bottom board inside, while the holding mechanism holding the box material in a state where the box material is developed in a cylindrical shape from a folded state. The folding mechanism folds the bottom flap inside so as to overlap with one of the bottom boards. The holding mechanism causes the other bottom board to contact the second jig while holding the box material and folds the other bottom board inside and upwardly so as to overlap with the bottom flap to engage the bottom boards with each other.

8 Claims, 13 Drawing Sheets

(51) Int. Cl.
*B65D 5/02* (2006.01)
*B31B 50/60* (2017.01)
*B25J 13/00* (2006.01)

(58) Field of Classification Search
CPC ........... B31B 3/62; B31B 50/36; B31B 50/60; B65D 5/22
USPC .......... 493/116, 162; 53/381.1, 381.3, 381.5, 53/381.7, 385.1
See application file for complete search history.

(56) References Cited

FOREIGN PATENT DOCUMENTS

| | | | | | |
|---|---|---|---|---|---|
| JP | 2014-121813 | A | | 7/2014 | |
| JP | 2014-124798 | A | | 7/2014 | |
| JP | 2014121813 | A | * | 7/2014 | ............... B31B 3/30 |
| JP | 2014121813 | A | * | 7/2014 | ............... B31B 3/46 |
| JP | 2014-231146 | A | | 12/2014 | |
| JP | 2014231146 | A | * | 12/2014 | ............... B31B 3/42 |
| JP | 2014231146 | A | * | 12/2014 | ............... B31B 3/60 |
| JP | 2015-232823 | A | | 12/2015 | |
| JP | WO2014/125627 | A1 | | 2/2017 | |

\* cited by examiner (A)

(B)

(C)

(A)

(B)

BOX ASSEMBLY DEVICE AND METHOD OF ASSEMBLING BOX

TECHNICAL FIELD

The present disclosure relates to a box assembly device and a method of assembling a box.

BACKGROUND ART

Conventionally, the box assembly devices which assemble a box, is known (see Patent Documents 1 and 2). The devices three-dimensionally develops a piece of folded-up corrugated cardboard, bends flaps, and joining a joint of the folded flaps with a piece of adhesive tape etc. to form a bottom of the box, thereby assembling the corrugated cardboard in a box shape.

REFERENCE DOCUMENT OF CONVENTIONAL ART

Patent Documents

[Patent Document 1] JP2014-124798A
[Patent Document 2] WO2014/125627A1

DESCRIPTION OF THE DISCLOSURE

Problem to be Solved by the Disclosure

However, the conventional technologies require complicated processings in order to join the joint of the folded flaps, when forming the bottom of the box.

The present disclosure is made in view of solving the above problem, and provides a box assembly device capable of easily assembling a box.

SUMMARY OF THE DISCLOSURE

In order to solve the problem described above, a box assembly device according to one aspect of the present disclosure is provided, which assembles a box material having four side boards continuously provided via score lines, bottom boards provided to lower sides of a pair of side boards opposing to each other among the four side boards, and bottom flaps provided to lower sides of the other pair of side boards. The box assembly device includes a robot body having a holding mechanism configured to hold the box material, a folding mechanism configured to fold the bottom flaps of the box material inside, and a robotic arm to which the holding mechanism and the folding mechanism are attached, a control device configured to control operation of the robot body, a first jig fixedly installed, and a second jig fixedly installed so as to oppose to the first jig. While the holding mechanism holding the box material in a state where the box material is developed in a cylindrical shape from a folded state, the holding mechanism causes one of the bottom boards to contact the first jig to fold the bottom board inside. The folding mechanism folds the bottom flap inside so as to overlap with one of the bottom boards. The holding mechanism causes the other bottom board to contact the second jig while holding the box material and folds the other bottom board inside so as to overlap with the bottom flap to engage the bottom boards with each other.

According to this configuration, while holding the box material in a state where the box material is developed in the cylindrical shape from a folded state, one of the bottom boards is caused to contact the first jig to fold the bottom board inside. Next, the bottom flap is folded inside so as to overlap with one of the bottom boards. While holding the box material, the other bottom board is caused to contact the second jig and the other bottom board is folded inside and upwardly so as to overlap with the bottom flap. The bottom boards engage with each other and the bottom of the box is formed. In this manner, the box can be assembled easily with the simple configuration.

The holding mechanism may include a base part, a rotary joint having a horizontal rotation axis, a tip-end part rotatably coupled to the base part through the rotary joint, a holding part provided to the tip-end part and configured to hold the box material in the folded state, and a first bending part configured to develop the box material in the cylindrical shape by bending the box material held by the holding part.

According to this configuration, by the holding mechanism (e.g., an end effector) bending the box material in the folded state while holding the box material, the box material can be developed in the cylindrical shape.

The folding mechanism may include a base part, a supporting part provided to the base part and configured to support the box material developed in the cylindrical shape, and a second bending part configured to fold the bottom flap of the box material supported by the supporting part inside.

According to this configuration, while supporting the box material developed in the cylindrical shape by the folding mechanism (e.g., an end effector), the bottom flap of the box material can be folded inside.

The box assembly device may further include a blow mechanism fixedly installed between the first jig and the second jig and configured to blow air. The blow mechanism may blow air to each of the bottom flaps of the box material located above a space between the first jig and the second jig to spread the bottom flap outside. While the holding mechanism holding the box material of which the bottom flap is spread outside, the holding mechanism may cause one of the bottom boards to contact the first jig and fold the bottom board inside.

According to this configuration, by the blow mechanism blowing air to each of the bottom flaps of the box material located above the space between the first jig and the second jig, the bottom flap is spread outside. Then, while the holding mechanism holding the box material of which the bottom flap is spread outside, the holding mechanism causes one of the bottom boards to contact the first jig and folds the bottom board inside. In this manner, when folding one of the bottom boards inside, a work can be carried out, without interfering with the bottom flap.

According to another aspect of the present disclosure, a method of assembling a box by a box assembly device configured to assemble the box from a box material having four side boards continuously provided via score lines, bottom boards provided to lower sides of a pair of side boards opposing to each other among the four side boards, and bottom flaps provided to lower sides of the other pair of side boards, is provided. The box assembly device includes a robot body having a holding mechanism configured to hold the box material, a folding mechanism configured to fold the bottom flaps of the box material inside, and a robotic arm to which the holding mechanism and the folding mechanism are attached, a control device configured to control operation of the robot body, a first jig fixedly installed, and a second jig fixedly installed so as to oppose to the first jig. The method includes the step of while holding, by the holding mechanism, the box material in a state where the box material is developed in a cylindrical shape from a folded state, causing one of the bottom boards to contact the first jig and folding the bottom board inside. The method includes the step of folding, by the folding mechanism, the bottom flap inside so as to overlap with the one of the bottom boards. The method includes the step of causing, by the holding mechanism, the other bottom board to contact the second jig while holding the box material, and folding the other bottom board inside and upwardly so as to overlap with the bottom flap to engage the bottom boards with each other.

According to another aspect of the present disclosure, a box assembly device is provided, which assembles a box material having a bottom board and four side boards continuously provided via score lines to the bottom board. The box assembly device includes a robot body having a holding mechanism configured to hold the box material, a pressing mechanism configured to press against the box material, and a robotic arm to which the holding mechanism and the pressing mechanism are attached, a control device configured to control operation of the robot body, and a frame jig fixedly installed and conforming to the shape of the bottom board of the box. While the holding mechanism holding the box material in a state where the bottom board and the four side boards are developed in a flat board shape, the holding mechanism places the box material on the frame jig. The pressing mechanism presses from above against the bottom board of the box material disposed on the frame jig to fold the side boards with respect to the bottom board at score lines. In this manner, the box can be assembled easily with the simple configuration.

According to this configuration, while holding the box material in a state where the bottom board and the four side boards are developed in a flat board shape, this box material is placed on the frame jig. The bottom board of the box material disposed on the frame jig is pressed from above. In this manner, the side boards are folded with respect to the bottom board at score lines, and the bottom of the box is formed.

The pressing mechanism may include a first surface part configured to press against the box material from above, and a second surface part configured to press against the box material from a side way. The first surface part may be pressed from above against the bottom board of the box material disposed on the frame jig to fold the side board upwardly with respect to the bottom board at the score line so as to form the bottom of the box. The second surface part may be pressed from the side way against the side board folded upwardly with respect to the bottom board at the score line to fold the side board inside. The first surface part may be pressed from above against the side board folded inwardly to fold the side board downwardly toward the bottom board so as to form the side part of the box.

According to this configuration, the pressing mechanism includes a first surface part configured to press against the box material, and a second surface part configured to press against the box material from a side way. According to this, the first surface part is first pressed from above against the bottom board of the box material disposed on the frame jig. This causes the side board to be folded upwardly with respect to the bottom board at the score line so as to form the bottom of the box. Next, the second surface part is pressed from the side way against the side board folded upwardly with respect to the bottom board at the score line. This causes the side board to be folded inside. At last, the first surface part is pressed from above against the side board folded inwardly. This causes the side board to be folded downwardly toward the bottom board so as to form the side part of the box.

According to still another aspect of the present disclosure, a method of assembling a box by a box assembly device configured to assemble the box from a box material having a bottom board and four side boards continuously provided via score lines to the bottom board, is provided. The box assembly device includes a robot body having a holding mechanism configured to hold the box material, a pressing mechanism configured to press against the box material, and a robotic arm to which the holding mechanism and the pressing mechanism are attached, a control device configured to control operation of the robot body, and a frame jig fixedly installed and conforming to the shape of the bottom board of the box. While the holding mechanism holding the box material in a state where the bottom board and the four side boards are developed in a flat board shape, the holding mechanism places the box material on the frame jig. The pressing mechanism presses from above against the bottom board of the box material disposed on the frame jig to fold the side boards with respect to the bottom board at the score lines so as to form the bottom of the box.

Effect of the Disclosure

The present disclosure has a configuration described above and can provide the box assembly device capable of easily assembling a box.

MODES FOR CARRYING OUT THE DISCLOSURE

Figure 1:
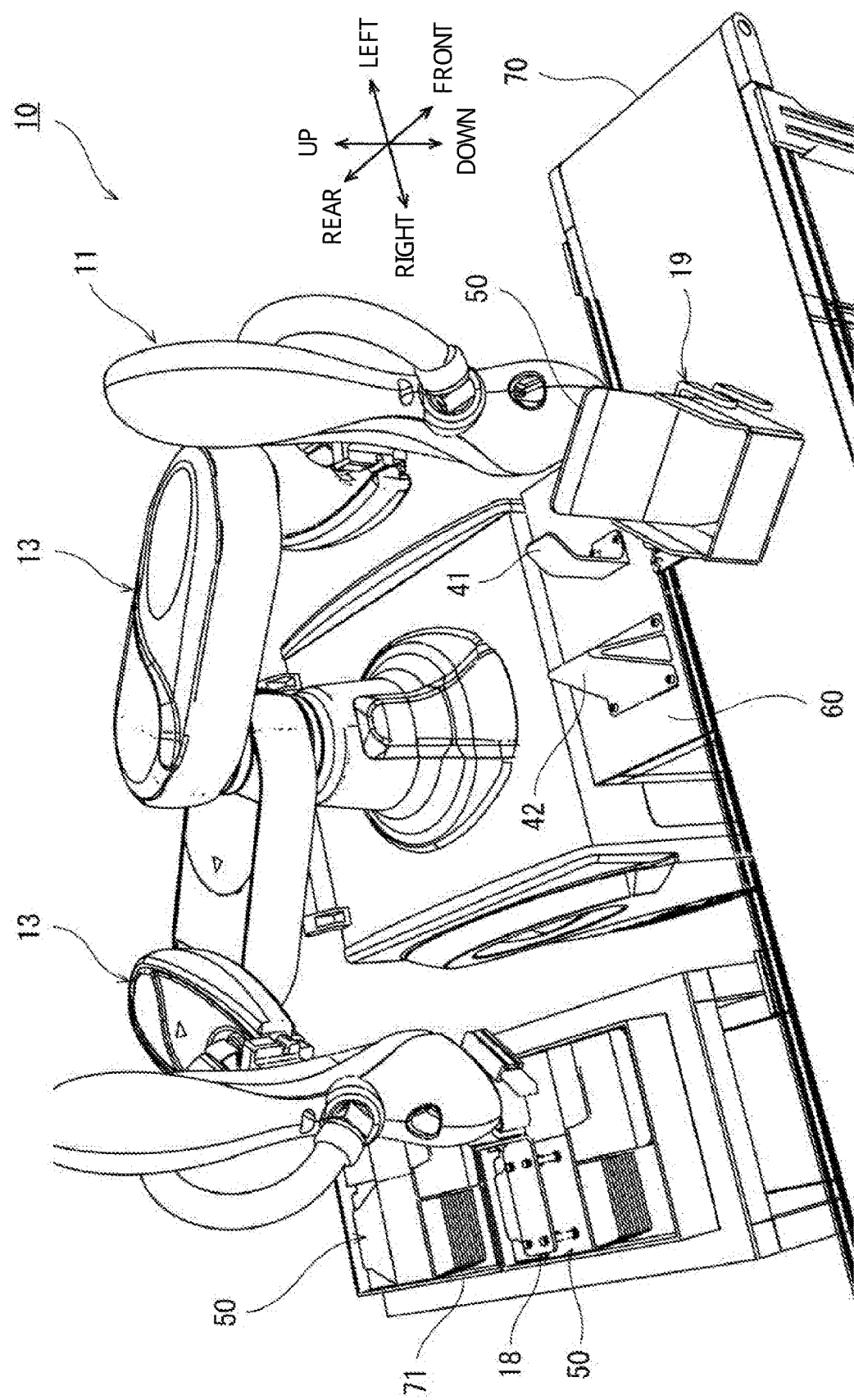
FIG. 1 is a view illustrating the entire configuration of the box assembly device according to a first embodiment.

Hereinafter, desirable embodiments will be described with reference to the drawings. Note that, below, the same reference characters are assigned to the same or corresponding elements throughout the drawings to omit redundant description. Moreover, the drawings are to schematically illustrate each component in order to facilitate understandings thereof. Further, a direction in which a pair of arms are extended is referred to as a "left-and-right direction," a direction parallel to an axis of a base shaft is referred to as an "up-and-down direction," and a direction perpendicular to the left-and-right direction and the up-and-down direction is referred to as a "front-and-rear direction."

First Embodiment

FIG. 1 is a view illustrating the entire configuration of the box assembly device 10 according to a first embodiment of the present disclosure. As illustrated in FIG. 1, for example, the box assembly device 10 is introduced into a manufacturing site etc. of a product or food, and is used for an assembling work of the box which packs the product or food. In this embodiment, a case where the box assembly device 10 according to the present disclosure is constituted by a robot 11 is described. The robot 11 is a dual-arm robot having a pair of robotic arms 13 supported by a base 12. However, the box assembly device 10 is not limited to the case where it is constituted by the robot 11. Note that, although a horizontal articulated dual-arm robot is described as the robot 11, a vertical articulated dual-arm robot may also be adopted. The robot 11 can be installed in a limited space corresponding to one person (e.g., 610 mm×620 mm).

A belt conveyor 70 is disposed in front of the robot 11, and a container 71 for accommodating a box material 50 is disposed on a table which is located on the right side of the robot 11. The belt conveyor 70 is a device for transferring an assembled box material 50 from the front to the right of the robot 11, and it extends in the left-and-right direction. A workbench 60 of the robot 11 is disposed between the base 12 of the robot 11 and the belt conveyor 70. The workbench 60 has a substantially square shape in a plan view, and is disposed at the front side of the base 12. On the workbench 60, a first jig 41 and a second jig 42 are fixedly installed. The first jig 41 and the second jig 42 are disposed so as to oppose to each other. The robot 11 takes out or extract the box material 50 accommodated in the container 71 by using end effectors 18 and 19 coupled to the right and left robotic arms 13, assembles or set up the box material 50 using the first jig 41 and the second jig 42, and sends out the assembled box material 50 onto the belt conveyor 70. In this embodiment, a workspace of the pair of robotic arms 13 is a space which covers the container 71, the workbench 60, and a part of the belt conveyor 70.

Figure 2:
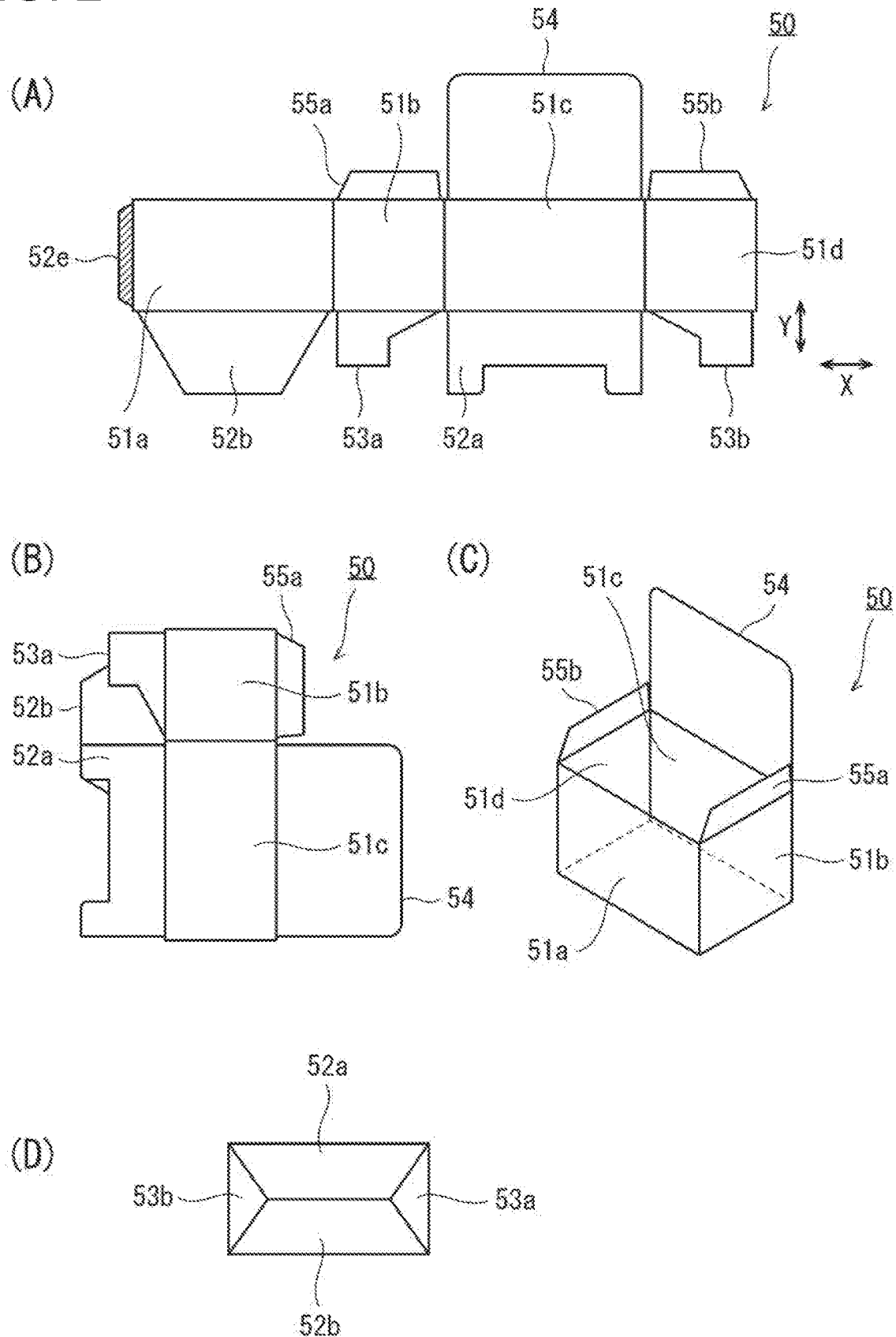
FIGS. 2(A) to (D) are views illustrating a structure of the box material of FIG. 1.

FIGS. 2(A) to (D) are views illustrating a structure of the box material 50. For example, the box material 50 is made of corrugated cardboard. FIG. 2(A) illustrates a developed view of the box material 50 (before assembly). As illustrated in FIG. 2(A), the box material 50 is assembled from a piece of sheet material having four side boards 51a, 51b, 51c, and 51d which are serially and continuously formed via score lines, bottom boards 52b and 52a provided so as to extend from lower sides of a pair of opposite side boards 51a and 51c among the side boards, bottom flaps 53a and 53b provided so as to extend from lower sides of the other pair of side boards 51b and 51d, a lid board 54 provided so as to extend from an upper side of the side board 51c, lid flaps 55a and 55b provided so as to extend from upper sides of the pair of side boards 51b and 51d. The side boards 51a and 51c are formed so that their lengths in the X-axis direction becomes equivalent to each other, and the side boards 51b and 51d are formed so that their lengths in the X-axis direction becomes equivalent to each other. A length of the lid board 54 in the X-axis direction is formed substantially the same as the length of the side boards 51a and 51c in the X-axis direction, and a length in the Y-axis direction is formed substantially the same as the length of the side boards 51b and 51d in the X-axis direction. Moreover, an adhering piece 52e is serially and continuously formed in an end edge of the side board 51a via a score line. By adhering the adhering piece 51e to an end edge of the side board 51d, the four side boards 51a, 51b, 51c, and 51d are provided continuously in series via the score lines. FIG. 2(B) is a plan view illustrating the box material 50 before assembly. As illustrated in FIG. 2(B), in the box material 50, the four side boards 51a, 51b, 51c, and 51d can be folded in half, where the adjacent two side boards are located on each side. The box material 50 before assembly is accommodated in the container 71 in this state (see FIG. 1). FIG. 2(C) illustrates a perspective view of the assembled box material 50. FIG. 2(D) is an external bottom view of the box after assembly. The bottom of the box material 50 is assembled by first folding the bottom board 52a inside, and the folding the bottom flaps 53a and 53b inside so that they are overlapped with the folded bottom board 52a. Then, the bottom board 52b is folded inside so as to overlap with the folded bottom flaps 53a and 53b. Thus, the bottom boards 52a and 52b are engaged with each other to form the bottom of the box material 50 (see FIG. 2(D)).

Figure 3:
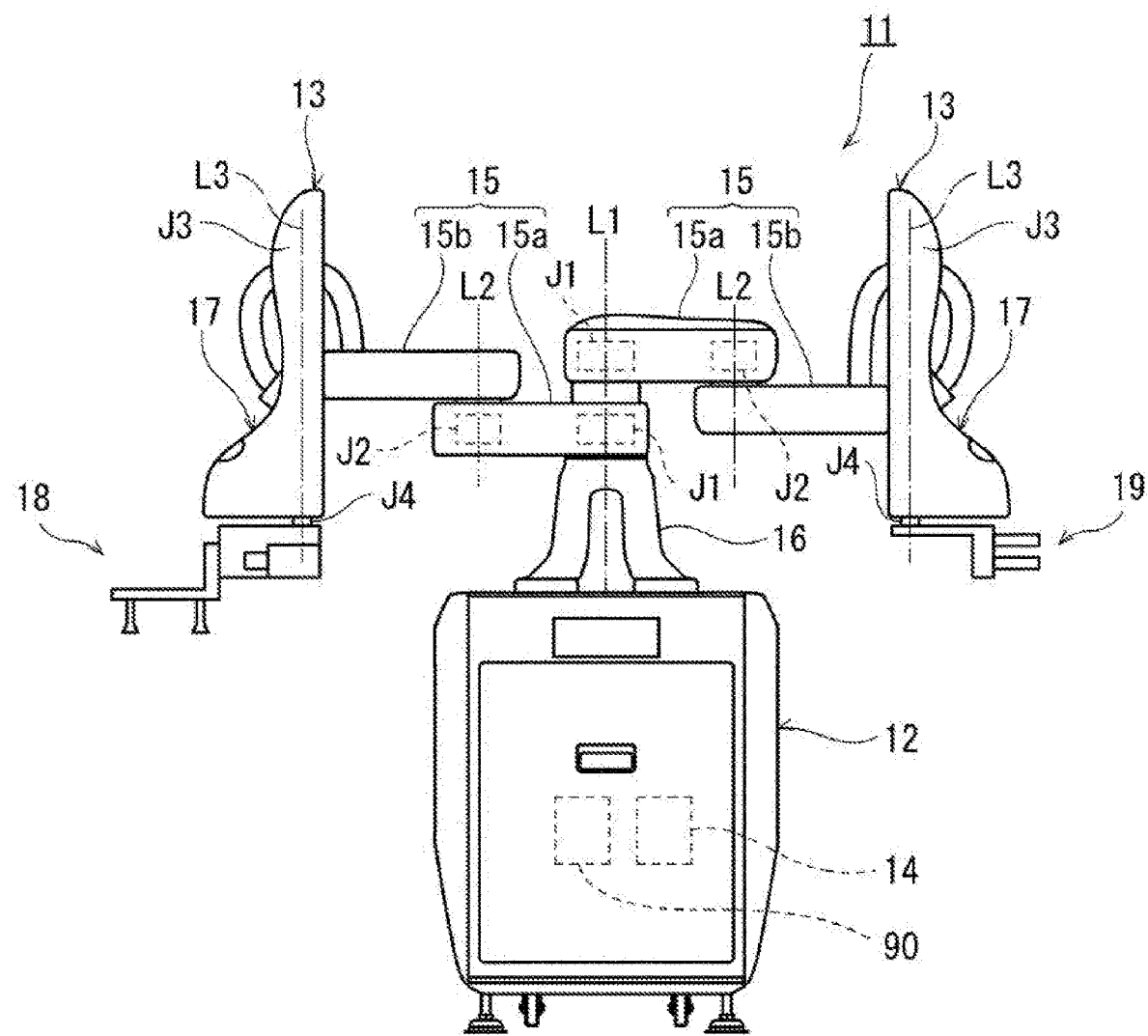
FIG. 3 is a front view schematically illustrating the entire configuration of one example of a robot of FIG. 1.

FIG. 3 is a front view schematically illustrating the entire configuration of one example of the robot 11. As illustrated in FIG. 3, the robot 11 includes the base 12 fixed to a carriage, the pair of robotic arms (hereinafter, may simply be referred to as "the arms") 13 supported by the base 12, a control device 14 accommodated in the base 12, and a vacuum generator 90. For example, the vacuum generator 90 is a device which generates negative pressure at suction heads 22 (described later), such as a vacuum pump or CONVUM®. Each arm 13 is a horizontal articulated robotic arm constructed movable with respect to the base 12, and is provided with an arm part 15, a wrist part 17, and the end effector 18 or 19. Note that the right arm 13 and the left arm 13 may have substantially the same structure. Moreover, the right arm 13 and the left arm 13 can operate independently or dependently.

In this example, the arm part 15 is comprised of a first link 15a and a second link 15b. The first link 15a is coupled to a base shaft 16 fixed to an upper surface of the base 12 through a rotary joint J1, and is rotatable about a rotation axis L1 passing through the axis of the base shaft 16. The second link 15b is coupled to a tip end of the first link 15a through a rotary joint J2, and is rotatable about a rotation axis L2 defined at the tip end of the first link 15a.

The wrist part 17 is comprised of an elevating part 17a and a rotary part 17b. The elevating part 17a is coupled to a tip end of the second link 15b and through a linear-motion joint J3, and is ascendable and descendible with respect to the second link 15b. The rotary part 17b is coupled to a lower end of the elevating part 17a through a rotary joint J4, and is rotatable about a rotation axis L3 defined at the lower end of the elevating part 17a.

Each of the end effectors 18 and 19 is coupled to the rotary part 17b of the wrist part 17. The end effector 18 is provided to a tip end of the right arm 13, and the end effector 19 is provided to a tip end of the left arm 13.

Each arm 13 having the above configuration has joints J1-J4. The arm 13 is provided with servomotors for drive (not illustrated) corresponding to the respective joints J1-J4, and encoders (not illustrated) which detect rotation angles of the respective servomotors. Moreover, the rotation axes L1 of the first links 15a of the two arms 13 are located on the same straight line, and the first link 15a of one arm 13 and the first link 15a of the other arm 13 are provided at different heights.

Figure 4:
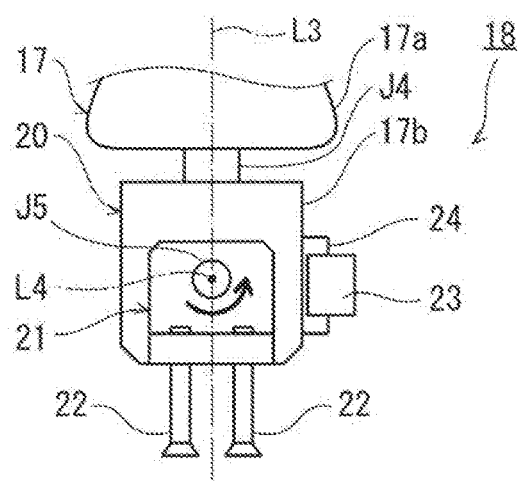
FIGS. 4(A) to (C) are views illustrating a configuration of an end effector of a right arm of FIG. 3.
Figure 4:
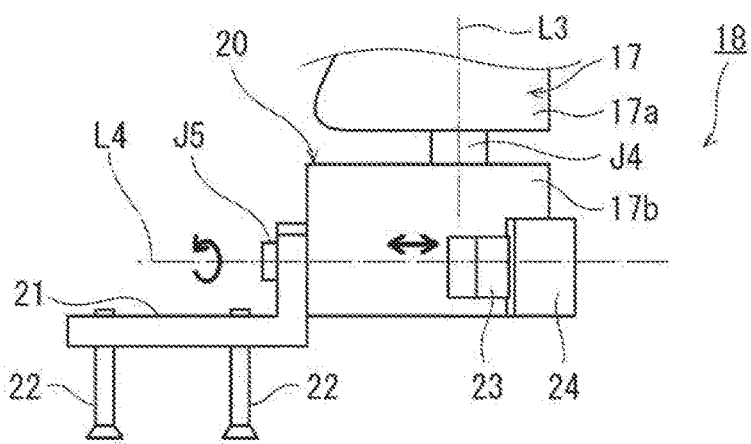
Figure 4:
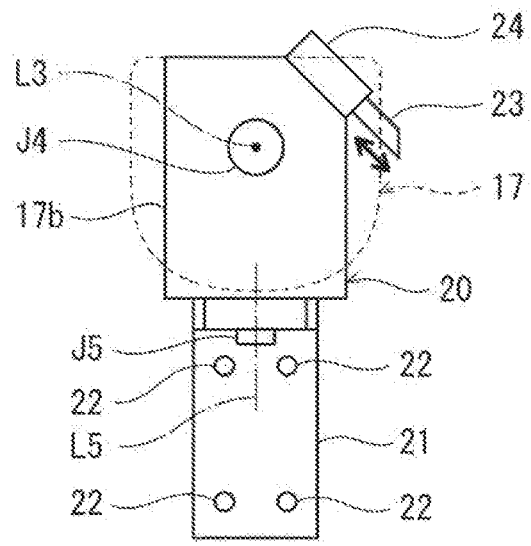

FIGS. 4(A) to (C) are views illustrating a configuration of the end effector 18 of the right arm 13. FIG. 4(A) illustrates a front view. FIG. 4(B) illustrates a side view. FIG. 4(C) illustrates a plan view.

The end effector 18 is a holding mechanism which holds the box material 50. The end effector 18 includes a base part 20 including the rotary part 17b of the wrist part 17, a rotary joint J5 having a horizontal rotation axis L4, and a tip-end part 21 rotatably coupled to the base part 20 through the rotary joint J5, a suction head (holding part) 22 which is provided to the tip-end part 21 and sucks and holds the box material 50 in the state where it is folded, and a first bending part 23 which develops the box material 50 into a cylindrical shape by bending the box material 50 (side board) held by the suction heads 22.

The base part 20 is coupled to the elevating part 17a of the wrist part 17 through the rotary joint J4 and is coupled to the tip-end part 21 through the rotary joint J5. The tip-end part 21 is coupled to the base part 20 through the rotary joint J5, and the suction heads 22 is attached to the tip-end part 21. The tip-end part 21 is bent into a substantially L-shape in the side view (see FIG. 4(B)). The base part 20 is a rectangular shape in the plan view (see FIG. 4(C)). In this embodiment, four suction heads 22 having the same length are formed at four locations on the back side surface of the tip-end part 21. Tip ends of the four suction heads 22 are constructed so as to contact the box material 50 (side board). As illustrated in the figures, the position of the tip ends of the suction heads 22 when they are oriented downwardly is referred to as a "reference position" of the suction heads 22. The suction heads 22 are connected with the vacuum generator 90 (see FIG. 3) through piping (not illustrated). For example, an on-off valve (not illustrated) is provided in the piping. By opening and closing the piping by the on-off valve, suction and release by the suction heads 22 are performed. By the suction heads 22, the box material 50 in the state where it is folded up can be sucked and held. Moreover, by the rotary joint J5, the tip-end part 21 which sucks and holds the box material 50 is rotatable with respect to the base part 20.

The first bending part 23 is connected with the wrist part 17 through a driving part 24. The driving part 24 is provided with an actuator (not illustrated) therein. The tip end of the first bending part 23 is configured to be telescopically movable in an arrow direction by the actuator of the driving part 24 moving linearly (see FIGS. 4(B) and (C)). The box material 50 (side board) held by the suction heads 22 is bent by the tip end of the first bending part 23. Therefore, the box material 50 can be developed in a cylindrical shape.

Figure 5:
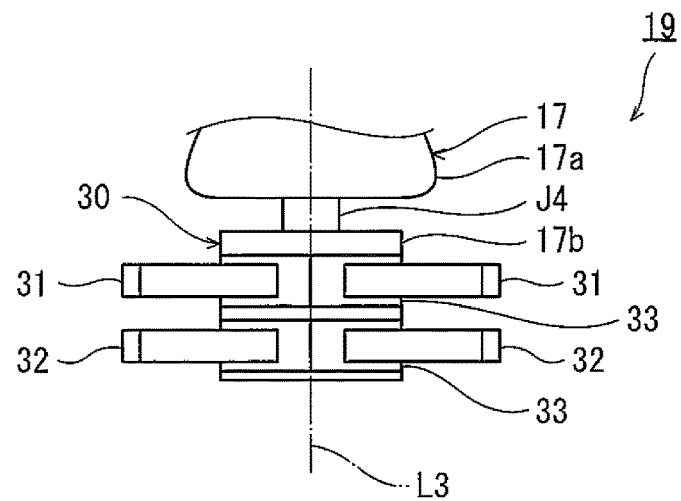
FIGS. 5(A) to (C) are views illustrating a configuration of an end effector of a left arm of FIG. 3.
Figure 5:
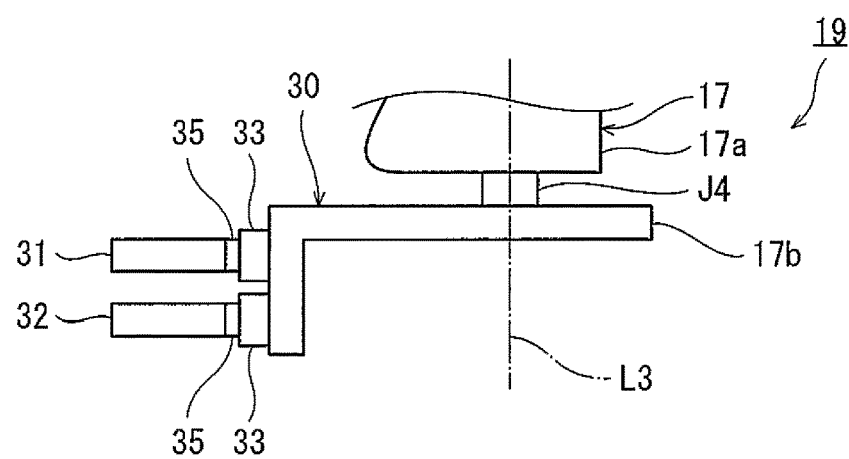
Figure 5:
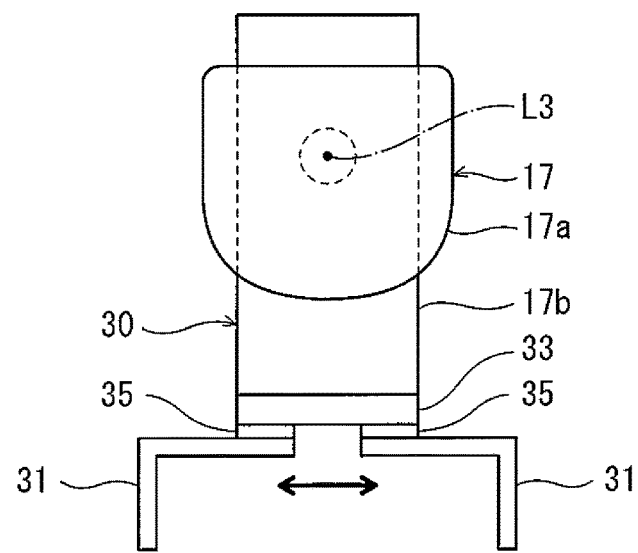

FIGS. 5(A) to (C) are views illustrating a configuration of the end effector 19 of the left arm 13. FIG. 5(A) illustrates a front view. FIG. 5(B) illustrates a side view. FIG. 5(C) illustrates a plan view. The end effector 19 includes a base part 30 having the rotary part 17b of the wrist part 17, a first hand 31 attached to the base part 30 through a connecting part 33, and a second hand 32 attached to the base part 30 through the connecting part 33.

The first hand 31 has a pair of finger parts. Each finger part has an L-shape in the plan view. A driving part 35 drives the pair of finger parts. The driving part 35 is provided to the connecting part 33, and has an actuator (not illustrated) therein. By the actuator of the driving part 35 moving linearly, the pair of finger parts change their mutual interval. By this actuation of the driving part 35, the pair of finger parts can reduce the mutual interval to pinch and support the box material 50. The first hand 31 corresponds to a "supporting part" of the present disclosure.

The second hand 32 has a pair of finger parts. Each finger part has an L-shape in the plan view. The driving part 35 drives the pair of finger parts. The driving part 35 is provided to the connecting part 33, and has an actuator (not illustrated) therein. By the actuator of the driving part 35 moving linearly, the pair of finger parts change their mutual interval. By this actuation of the driving part 35, the pair of finger parts can reduce the mutual interval to fold the bottom flaps 53a and 53b of the box material 50 inwardly. The second hand 32 corresponds to a "second bending part" of the present disclosure.

Figure 6:
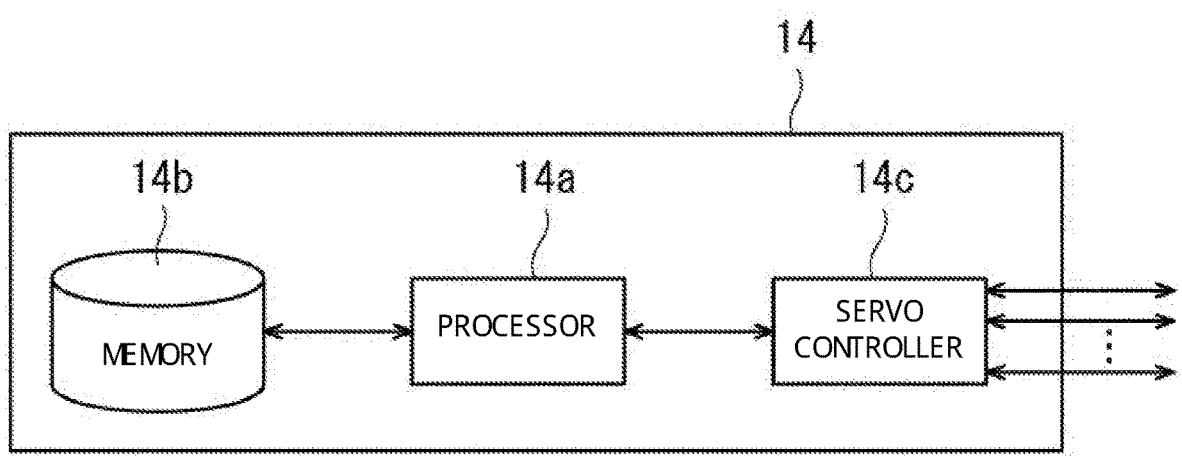
FIG. 6 is a functional block diagram schematically illustrating a configuration of a control device.
Figure 7:
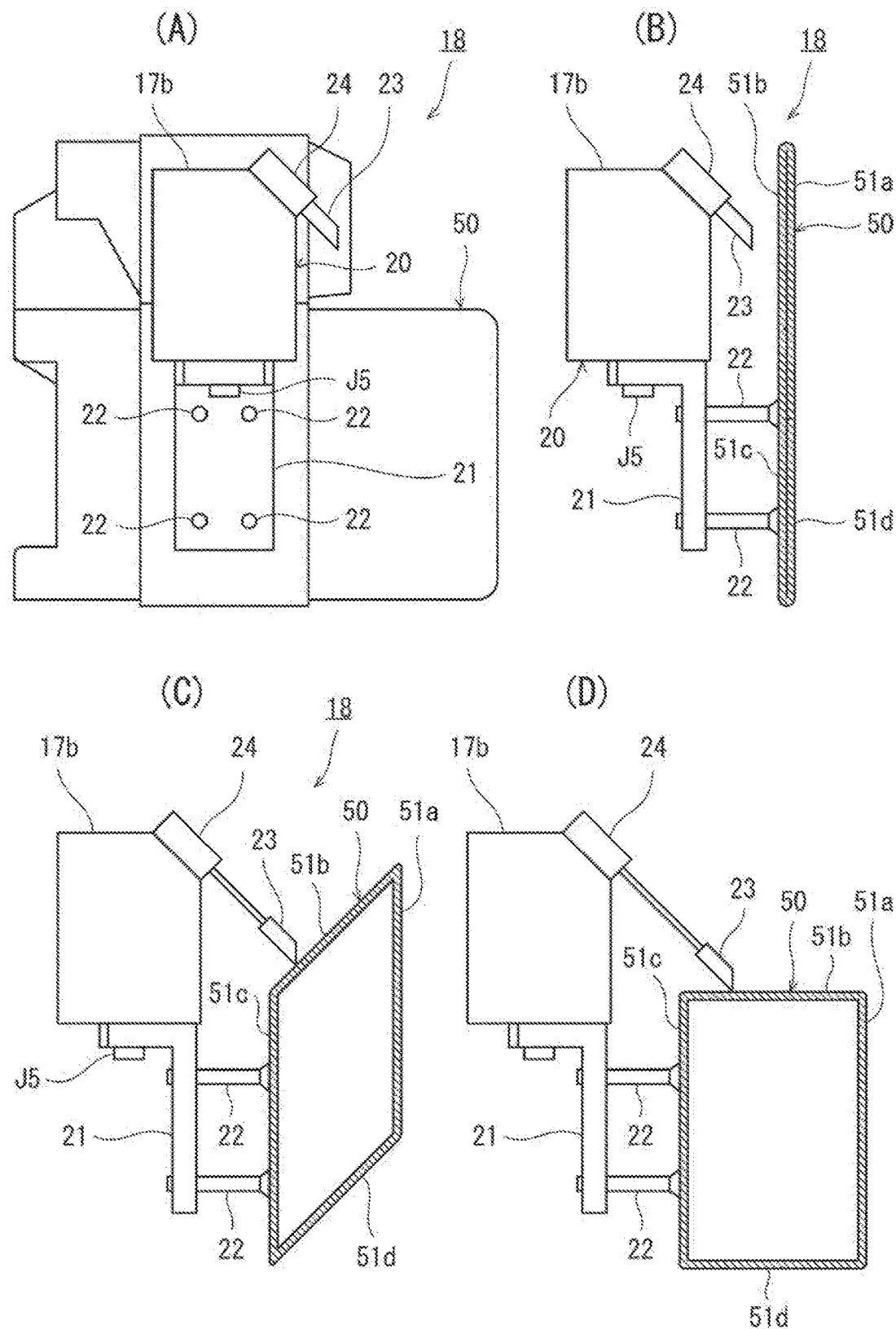
FIGS. 7(A) to (D) are views schematically illustrating a holding operation of the box material.
Figure 8:
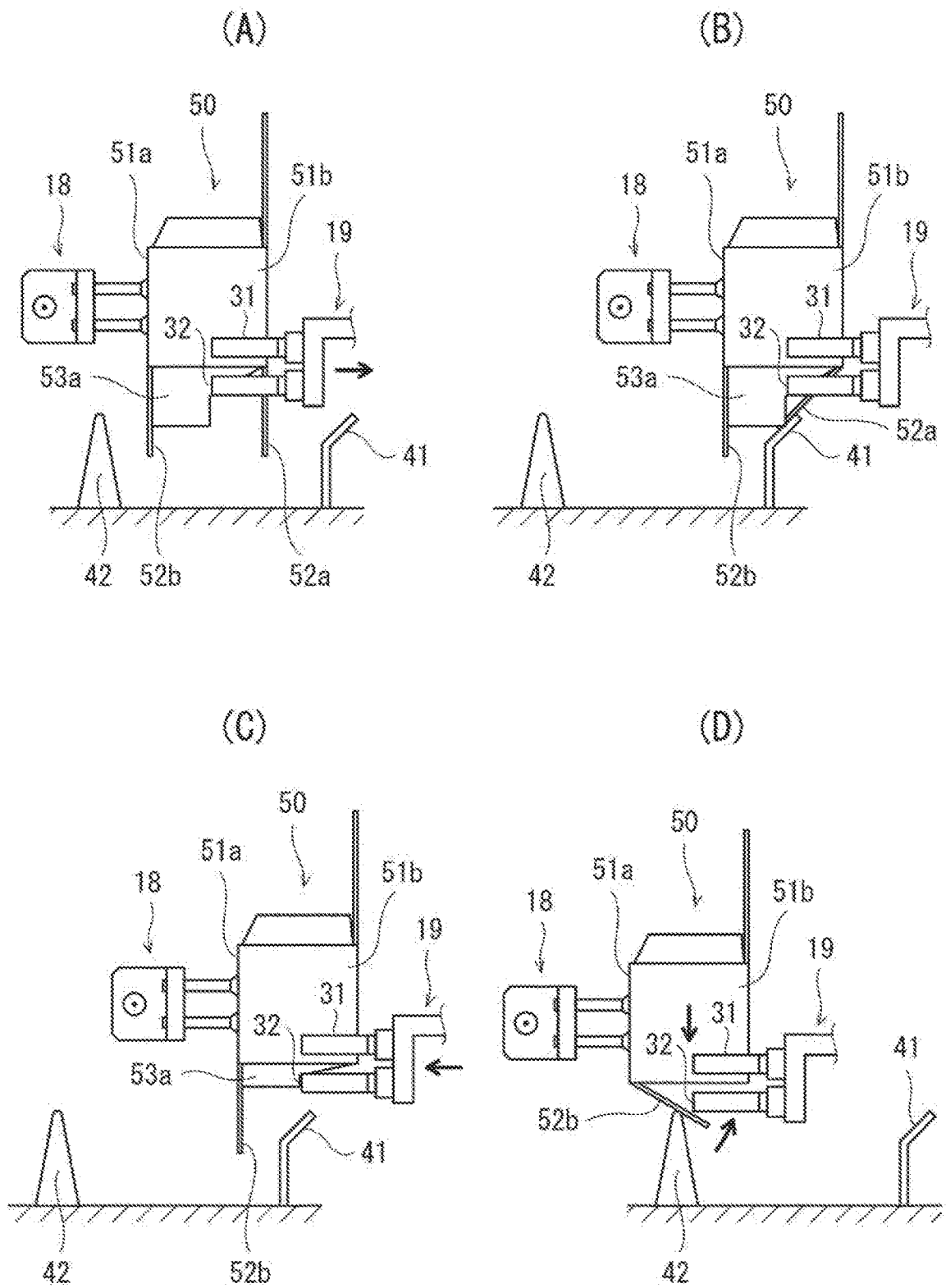
FIGS. 8(A) to (D) are views schematically illustrating an assembling operation of the box material.

FIG. 6 is a functional block diagram schematically illustrating a configuration of the control device 14 of the robot 11. As illustrated in FIG. 6, the control device 14 includes a processor 14a, such as a CPU, a memory 14b, such as a ROM and a RAM, and a servo controller 14c. For example, the control device 14 is a robot controller provided with a computer, such as a microcontroller. Note that the control device 14 may be comprised of a sole control device 14 which carries out a centralized control, or may be comprised of a plurality of control devices 14 which collaboratively carry out a distributed control.

The memory 14b stores information, such as a basic program as a robot controller, various fixed data, etc. The processor 14a controls various operations of the robot 11 by reading and executing software, such as the basic program stored in the memory 14b. That is, the processor 14a generates a control command of the robot 11 and outputs it to the servo controller 14c. Based on the control command generated by the processor 14a, the servo controller 14c controls the actuation of the servomotors corresponding to the joints J1-J5 etc. of each arm 13 of the robot 11.

Moreover, the control device 14 controls operation of the vacuum generator 90 (see FIG. 3), and the opening and closing of the on-off valve. When the piping is opened and closed by opening and closing the on-off valve, the suction and release of the suction heads 22 are performed.

Next, an assembling operation of the box performed by the box assembly device 10 is described with reference to the drawings (FIGS. 1 and 7-9). As illustrated in FIG. 1, prior to the assembling operation, a plurality of box materials 50 are piled up and accommodated in the container 71 in the state where the box materials 50 are each folded up in two (see FIG. 2(B)).

First, the robot 11 uses the end effector 18 at the tip end of the right arm 13 to suck and hold the top box material 50 inside the container 71. FIGS. 7(A) to (D) are plan views schematically illustrating a situation in which the box material 50 is held by the end effector 18. In detail, as illustrated in FIG. 7(A), the suction heads 22 of the end effector 18 suck and hold the side board 51c of the box material 50 in the state where the box material 50 is folded in half. Next, as illustrated in FIG. 7(B), the rotary joint J5 rotates the tip-end part 21 which is sucking and holding the side board 51c of the box material 50 by 90° with respect to the base part 20. Next, as illustrated in FIG. 7(C), the tip end of the first bending part 23 is driven to cause the tip end to contact the side board 51b adjacent to the side board 51a of the box material 50.

Then, as illustrated in FIG. 7(D), the tip end of the first bending part 23 is further linearly driven to bend the side board 51b adjacent to the side board 51a of the box material 50 held by the suction heads 22 so that the side board 51b becomes substantially perpendicular to the side board 51a. Thus, the box material 50 held by the end effector 18 develops into the cylindrical shape. Then, the robot 11 moves the right arm 13 to convey the cylindrical box material 50 held by the end effector 18 onto the workbench 60.

FIGS. 8(A) to (D) are views of the assembling operation of the box material 50. As illustrated in FIG. 8(A), while the robot 11 holds the side board 51*a* of the cylindrical box material 50 by the end effector 18 attached to the tip end of the right arm 13, it supports the box material 50 by pinching the side board 51*b* (51*d*) of the box material 50 by the first hand 31 of the end effector 19 attached to the tip end of the left arm 13. At this time, the bottom boards 52*a* and 52*b* and the bottom flap 53*a* (53*b*) of the box material 50 are located above a space between the first jig 41 and the second jig 42. Next, the robot 11 moves the left and right arms 13 to move the box material 50 toward the first jig 41 (in an arrow direction in this figure), while maintaining the box material 50 in the state where the box material 50 is developed in the cylindrical shape by using the end effectors 18 and 19. As illustrated in FIG. 8(B), the robot 11 causes the bottom board 52*a* of the box material 50 to contact the first jig 41 and folds the bottom board 52*a* inwardly.

As illustrated in FIG. 8(C), the second hand 32 of the end effector 19 folds the bottom flap 53*a* (53*b*) inwardly so as to overlap with the bottom board 52*a*. Then, by moving the left and right arms 13, the box material 50 is moved toward the second jig 42 (in an arrow direction in this figure).

As illustrated in FIG. 8(D), the left and right arms 13 causes the bottom board 52*b* of the box material 50 to contact the second jig 42 and folds the bottom board 52*b* inwardly so as to overlap with the folded bottom flap 53*a* (53*b*), thereby engaging the bottom boards 52*a* and 52*b* with each other. Thus, the bottom of the box is formed (see FIG. 2(D)). According to the box assembly device 10 of this embodiment, the box can be easily assembled with the simple configuration.

Modification

Figure 9:
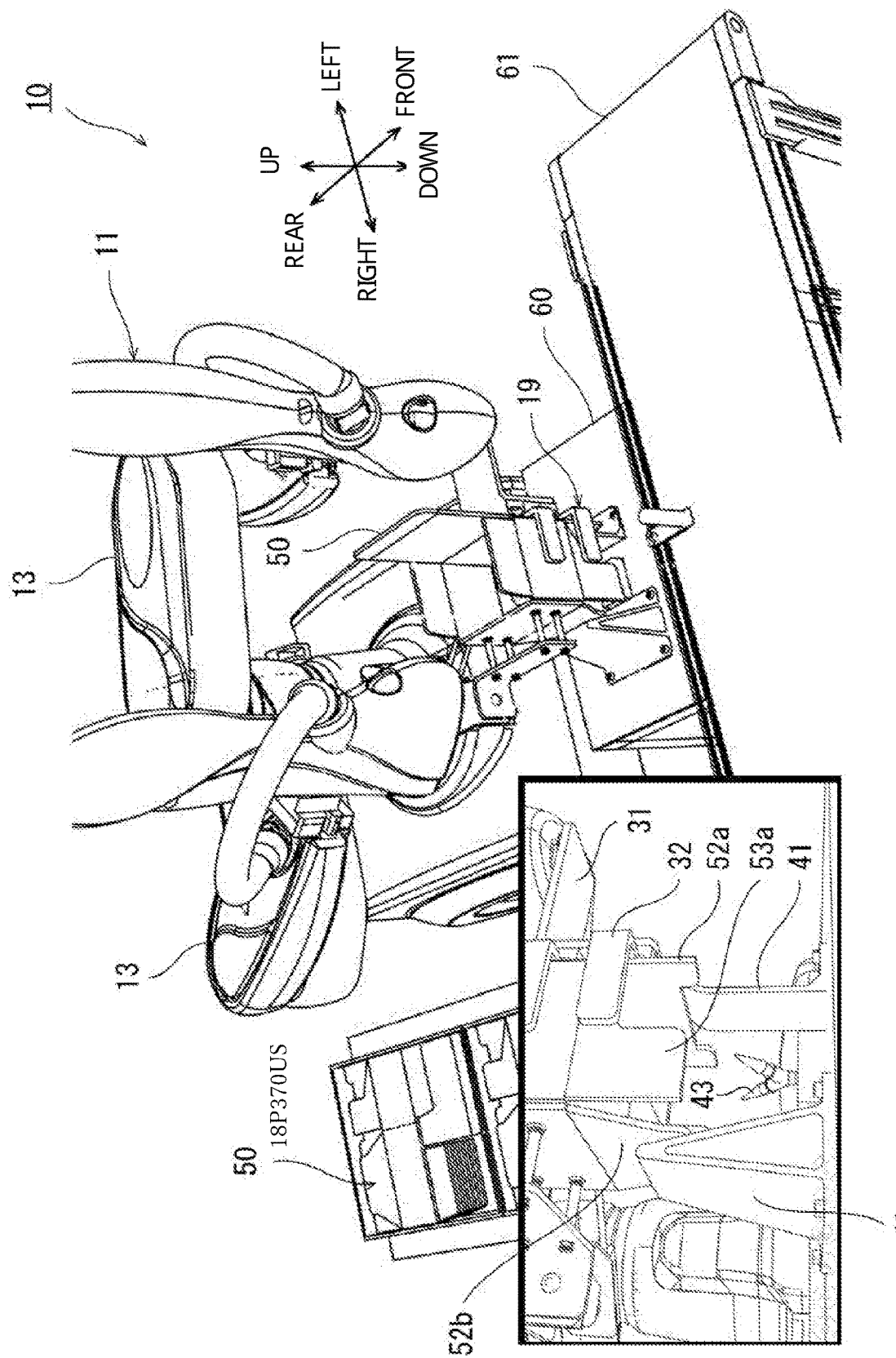
FIG. 9 is a view illustrating an assembling operation of the box material according to one modification.

FIG. 9 is a view of an assembling operation of the box material according to one modification. As illustrated in FIG. 9, in this modification, a blow device 43 is fixedly installed on the workbench 60. The blow device 43 is disposed between the first jig 41 and the second jig 42. During the assembling operation, while the robot 11 holds the side board 51*a* of the cylindrical box material 50 by the end effector 18 attached to the tip end of the right arm 13, it supports the box material 50 by pinching the side boards 51*b* and 51*d* of the box material 50 with the end effector 19 attached to the tip end of the left arm 13. At this time, the bottom boards 52*a* and 52*b* and the bottom flaps 53*a* and 53*b* of the box material 50 are located above the space between the first jig 41 and the second jig 42. The blow device 43 has nozzle holes for air branched in two, and it is disposed so that the nozzle holes are directed to the bottom flaps 53*a* and 53*b* located thereabove. By the blow device 43 blowing air toward each of the bottom flaps of the box material 50 located above the workbench 60, the bottom flaps 53*a* and 53*b* can be spread outside. When folding the bottom board 52*a* inside, this work can be carried out, without the bottom board 52*a* interfering with the bottom flaps 53*a* and 53*b*.

Second Embodiment

Next, a second embodiment is described. A fundamental configuration of a box assembly device of this embodiment is similar to that of the first embodiment. Below, description of the configuration common to the first embodiment is omitted, and only different configurations are described.

Figure 10:
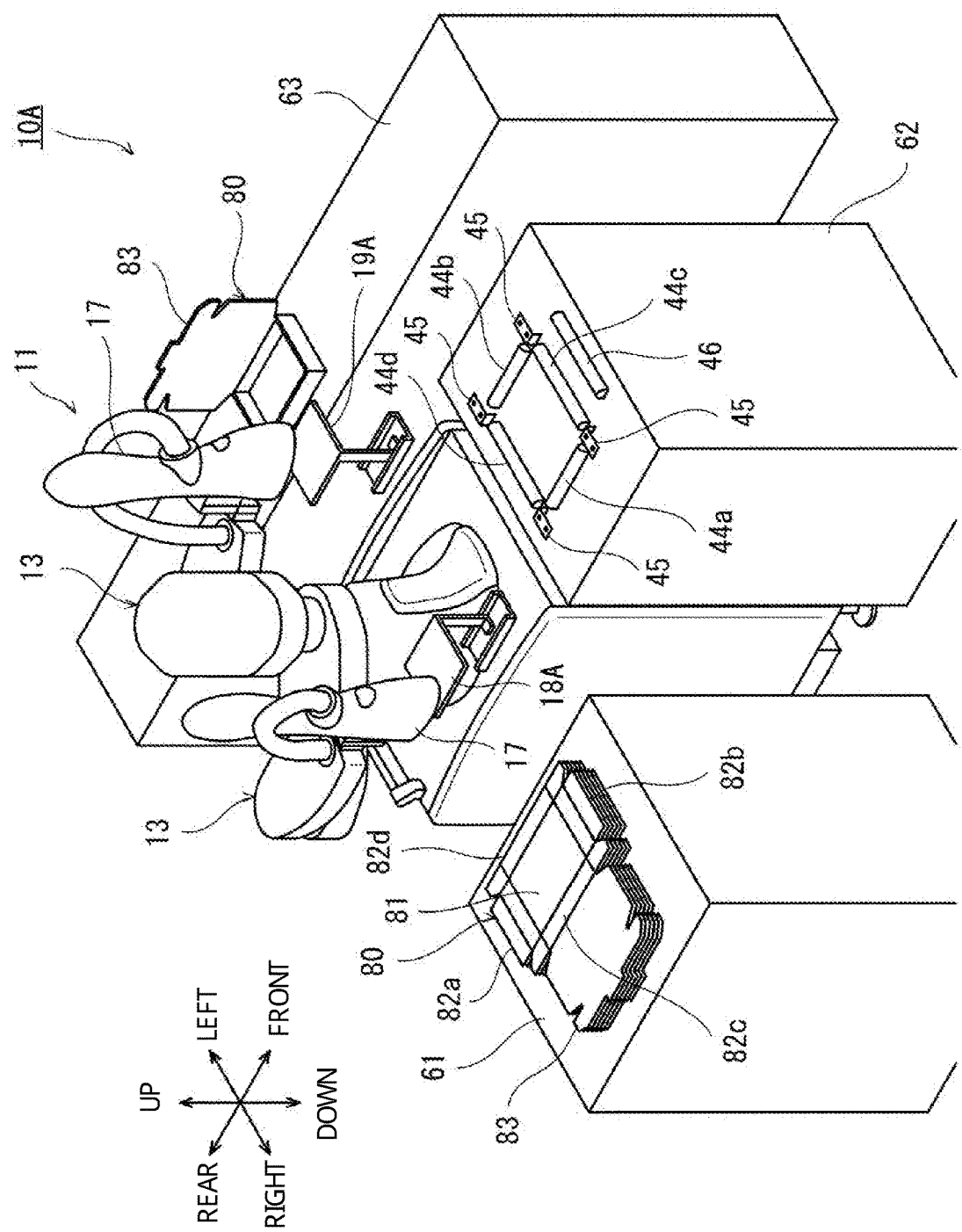
FIG. 10 is a view illustrating the entire configuration of the box assembly device according to a second embodiment.
Figure 11:
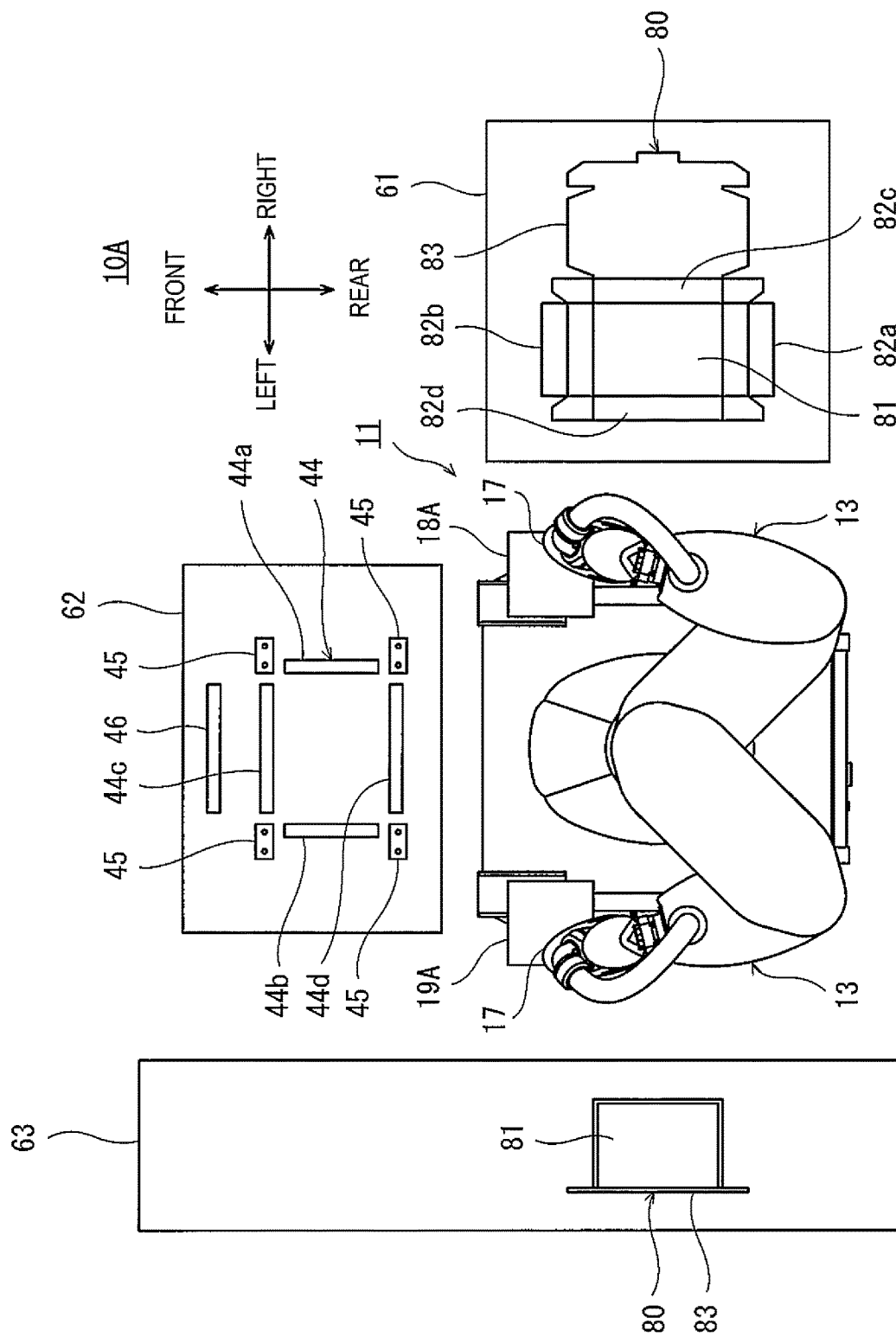
FIG. 11 is a plan view of the box assembly device of FIG. 10.

FIG. 10 is a view illustrating the entire configuration of the box assembly device 10A according to the second embodiment. FIG. 11 is a plan view of the box assembly device 10A of FIG. 10. This embodiment is different from the configuration of the first embodiment in the structure of a box material 80 to be assembled, and in that a frame jig 44 is used instead of the two jigs 41 and 42. As illustrated in FIGS. 10 and 11, workbenches 61, 62, and 63 are disposed on the right, front, and left sides of the robot 11, respectively. On the workbench 61, the box materials 80 before assembly are piled up and disposed in a state where they are developed in a flat board shape. The box material 80 of this embodiment has a bottom board 81, four side boards 82*a*, 82*b*, 82*c*, and 82*d* which are each formed continuously from the bottom board via a score line, and a lid part 83. On the workbench 62, the frame jig 44 which conforms to the shape of the bottom board 81 of the box material 80 is fixedly installed. The frame jig 44 is comprised of a jig 44*a* corresponding to one side of the bottom board 81 on the side board 82*a* side, a jig 44*b* corresponding to one side of the bottom board 81 on the side board 82*b* side, a jig 44*c* corresponding to one side of the bottom board 81 on the side board 82*c* side, and a jig 44*d* corresponding to one side of the bottom board 81 on the side board 82*d* side. In this embodiment, a jig 46 which supports the lid part 83 is disposed, and the four jigs 45 which support the continuous side boards are disposed at four corners. The assembled box material 80 is disposed on the workbench 63.

The robot 11 uses the end effectors 18A and 19A coupled to the right and left arms 13, respectively, to take out the box material 80 on the workbench 61, assembles the box material 80 on the workbench 62, and places the assembled box material 80 on the workbench 63. In this embodiment, a workspace of the pair of robotic arms 13 is a space which covers the workbenches 61, 62, and 63.

Figure 12:
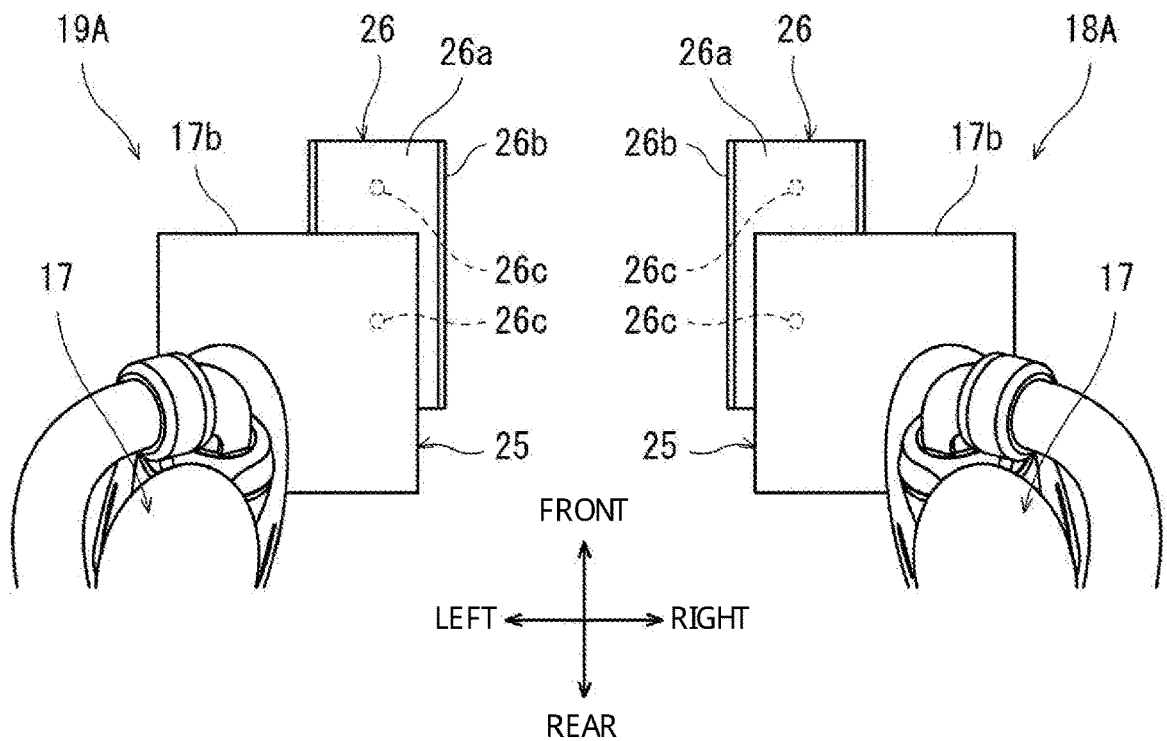
FIGS. 12(A) and (B) are views illustrating configurations of end effectors of left and right arms.
Figure 12:
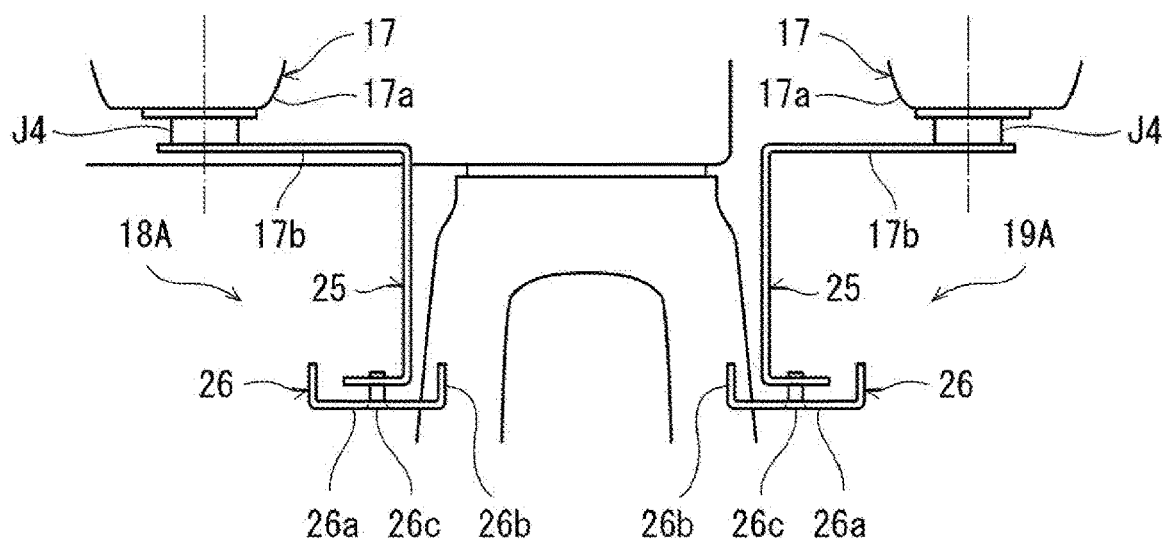

FIGS. 12(A) and (B) illustrate configurations of the end effectors 18A and 19A of the right and left arms 13. FIG. 12(A) is a plan view of the left and right wrist parts 17. FIG. 12(B) is a front view of the left and right wrist parts 17. As illustrated in FIG. 12, since the configurations of the right and left end effectors 18A and 19A are laterally symmetrical and have the same configuration, only one of the configurations is described.

The end effector 18A includes a base part 25 having the rotary part 17*b* of the wrist part 17, and a pressing part 26 fixedly connected to the base part 25.

The base part 25 has a substantially square shape in the plan view, and is comprised of a member which curves in an L-shape in the front view. The pressing part 26 includes a first surface part 26*a* for pressing against the box material 80 from above, and a second surface part 26*b* for pressing against the box material from a side way. In this embodiment, the pressing part 26 has a U-shape in the front view, and the first surface part 26*a* and the second surface part 26*b* are located substantially perpendicularly to each other. Two suction heads 26*c* are provided to the first surface part 26*a*. By this suction heads 26*c*, the box material 80 in a state where the first surface part 26*a* is pressed against the box material 80 from above can be sucked and held. Thus, the end effector 18A can hold the box material 80 and press against the box material 80. The end effector 18A corresponds to a "holding mechanism" and a "pressing mechanism" of the present disclosure.

Next, an assembling operation of the box by the box assembly device 10A is described with reference to schematic diagrams in FIGS. 13(A) to (H). Note that, as for the frame jig 44 in FIGS. 13(A) to (H), only the jig 44a corresponding to one side of the bottom board 81 on the side board 82a side of the box material 80, and the jig 44b corresponding to one side of the bottom board 81 on the side board 82b side are illustrated for convenience.

Figure 13:
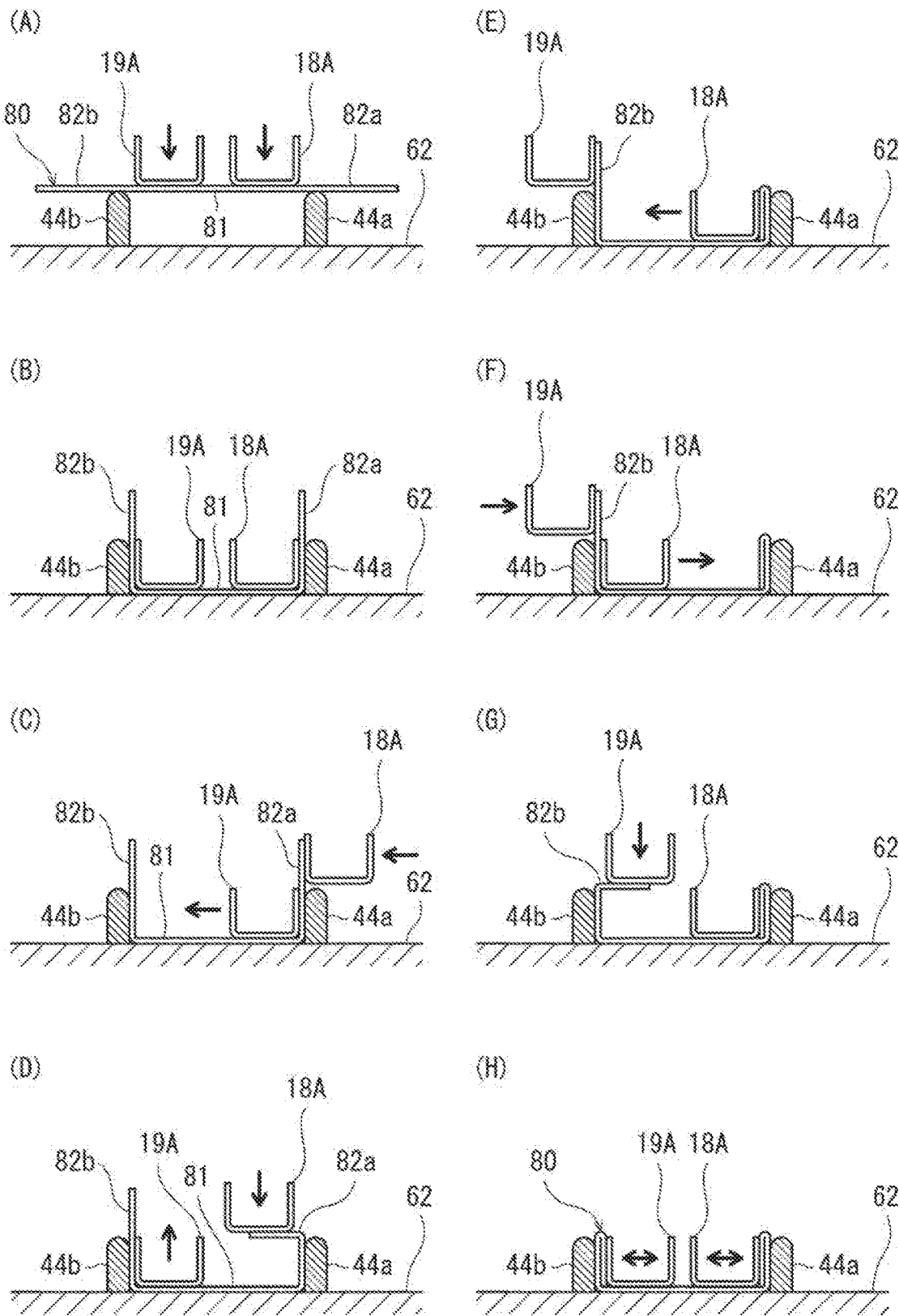
FIGS. 13(A) to (H) are views schematically illustrating an assembling operation of the box material.

First, as illustrated in FIG. 13(A), the robot 11 uses one of the right and left end effectors 18A and 19A to place the box material 80 on the frame jig 44, while holding the box material 80 in which the bottom board 81 and the four side boards 82 are developed in the flat board shape.

Next, as illustrated in FIG. 13(B), the robot 11 folds the side boards 82a and 82b with respect to the bottom board 81 at score lines (not illustrated) by the right and left end effectors 18A and 19A (the first surface parts 26a) pressing from above against the bottom board 81 of the box material 80 disposed on the frame jig 44. Thus, the bottom of the box is formed.

Next, a right side part of the box is formed. In detail, as illustrated in FIG. 13(C), the robot 11 presses the right end effector 18A (the second surface part 26b) from the outside against the right side board 82a which is folded upwardly to fold the side board 82a inside. At this time, the robot 11 presses the left end effector 19A (the second surface part 26b) from the inside against the side board 82a which is folded upwardly. Thus, the side board 82a becomes easier to be folded inwardly.

Next, as illustrated in FIG. 13(D), the robot 11 presses the right end effector 18A (the first surface part 26a) from above against the right side board 82a which is folded inwardly to fold the side board 82a downwardly toward the bottom board 81. Thus, the right side part of the box is formed.

Next, a left side part of the box is formed. In detail, as illustrated in FIG. 13(E), the left end effector 19A is moved to the outside of the left side board 82b which is folded upwardly, and the right end effector 18A is moved to the inside of the left side board 82b.

Next, as illustrated in FIG. 13(F), the robot 11 presses the left end effector 19A (the second surface part 26b) from the outside against the left side board 82b which is folded upwardly to fold the side board 82b inside. At this time, the robot 11 presses the right end effector 18A (the second surface part 26b) from the inside against the left side board 82a which is folded upwardly. Thus, the side board 82b becomes easier to be folded inside.

Next, as illustrated in FIG. 13(G), the robot 11 presses the left end effector 19A (the first surface part 26a) from above against the left side board 82b which is folded inside to fold the side board 82b downwardly toward the bottom board 81. Therefore, the left side part of the box is formed. Therefore, the box material 80 is assembled.

Finally, as illustrated in FIG. 13(H), the robot 11 presses the right and left end effectors 18A and 19A from the inside of the box against the bottom and the side parts to adjust the internal shape of the box. According to this embodiment, the box can be easily assembled with the simple configuration.

Another Embodiment

Note that, although each of the above embodiments is configured so that the dual-arm robot 11 performs the assembling work of the box, another embodiment may be implemented with a dedicated device provided with the end effectors 18 (18A) and 19 (19A) and capable of performing a positioning control.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. Details of the structures and/or the functions may be changed substantially, without departing from the spirit of the present disclosure.

INDUSTRIAL APPLICABILITY

The present disclosure is useful at the manufacturing site of the product.

DESCRIPTION OF REFERENCE CHARACTERS 10, 10A Box Assembly Device
11 Robot
13 Right Arm, Left Arm
14 Control Device
17 Wrist Part
18, 18A End Effector
19, 19A End Effector
20 Base Part
21 Tip-end Part
22 Suction Head
23 Bending Part
24 Driving Part
25 Base Part
26 Pressing Part
26a First Surface Part
26b Second Surface Part
30 Base Part
31 First Hand Part
32 Second Hand Part
35 Driving Part
41 First Jig
42 Second Jig
43 Blow Device
44 Frame Jig
45, 46 Jig
50 Box Material
51 Side Board
52 Bottom Board
53 Bottom Flap
54 Lid Board
55 Lid Flap
60-63 Workbench
70 Belt Conveyor
71 Container
80 Box Material
81 Bottom Board
82 Side Board
83 Lid Part
90 Vacuum Generator

What is claimed is:
1. A box assembly device configured to assemble a box material having four side boards continuously provided via score lines, bottom boards provided to lower sides of a pair of side boards opposing to each other among the four side boards, and bottom flaps provided to lower sides of the other pair of side boards, the box assembly device comprising:
 a robot body having a holding mechanism configured to hold the box material, a folding mechanism configured to fold the bottom flaps of the box material inside, and a robotic arm to which the holding mechanism and the folding mechanism are attached;

a control device configured to control operation of the robot body;
a first jig fixedly installed; and
a second jig fixedly installed to oppose the first jig, wherein:
while the holding mechanism holding the box material in a state where the box material is formed into a cylindrical shape from a folded state, the holding mechanism causes one of the bottom boards to contact the first jig to fold the bottom board inside,
the folding mechanism folds the bottom flaps inside to overlap with the one of the bottom boards, and
the holding mechanism causes the other bottom board to contact the second jig while holding the box material and folds the other bottom board inside to overlap with the bottom flaps to engage the bottom boards with each other.

2. The box assembly device of claim 1, wherein the holding mechanism includes:
a base part;
a rotary joint having a horizontal rotation axis;
a tip-end part rotatably coupled to the base part through the rotary joint;
a holding part provided to the tip-end part and configured to hold the box material in the folded state; and
a first bending part configured to develop the box material into the cylindrical shape by bending the box material held by the holding part.

3. The box assembly device of claim 1, wherein the folding mechanism includes:
a base part;
a supporting part provided to the base part and configured to support the box material formed into in the cylindrical shape; and
a first bending part configured to fold the bottom flaps of the box material supported by the supporting part inside.

4. A box assembly device configured to assemble a box material having four side boards continuously provided via score lines, bottom boards provided to lower sides of a pair of side boards opposing to each other among the four side boards, and bottom flaps provided to lower sides of the other pair of side boards, the box assembly device comprising:
a robot body having a holding mechanism configured to hold the box material, a folding mechanism configured to fold the bottom flaps of the box material inside, and a robotic arm to which the holding mechanism and the folding mechanism are attached;
a control device configured to control operation of the robot body;
a first jig fixedly installed;
a second jig fixedly installed to oppose the first jig; and
a blow mechanism fixedly installed between the first jig and the second jig and configured to blow air, wherein:
while the holding mechanism holding the box material in a state where the box material is formed into a cylindrical shape from a folded state, the holding mechanism causes one of the bottom boards to contact the first jig to fold the bottom board inside,
the folding mechanism folds the bottom flaps inside to overlap with the one of the bottom boards,
the holding mechanism causes the other bottom board to contact the second jig while holding the box material and folds the other bottom board inside to overlap with the bottom flaps to engage the bottom boards with each other, the blow mechanism blows air to each of the bottom flaps of the box material located above a space between the first jig and the second jig to spread the respective bottom flap outside, and
while the holding mechanism holds the box material of which the bottom flap is spread outside, the holding mechanism causes one of the bottom boards to contact the first jig and folds the bottom board inside.

5. A method of assembling a box by a box assembly device configured to assemble the box from a box material having four side boards continuously provided via score lines, bottom boards provided to lower sides of a pair of side boards opposing to each other among the four side boards, and bottom flaps provided to lower sides of the other pair of side boards, the box assembly device including:
a robot body having a holding mechanism configured to hold the box material, a folding mechanism configured to fold the bottom flaps of the box material inside, and a robotic arm to which the holding mechanism and the folding mechanism are attached;
a control device configured to control operation of the robot body;
a first jig fixedly installed; and
a second jig fixedly installed to oppose the first jig,
the method of assembling the box comprising the steps of:
while holding, by the holding mechanism, the box material in a state where the box material is formed into a cylindrical shape from a folded state, causing one of the bottom boards to contact the first jig and folding the bottom board inside;
folding, by the folding mechanism, the bottom flaps inside to overlap with the one of the bottom boards; and
causing, by the holding mechanism, the other bottom board to contact the second jig while holding the box material, and folding the other bottom board inside and upwardly to overlap with the bottom flaps to engage the bottom boards with each other.

6. A box assembly device configured to assemble a box material having a bottom board and four side boards continuously provided via score lines to the bottom board, the box assembly device comprising:
a robot body having a holding mechanism configured to hold the box material, a pressing mechanism configured to press against the box material, and a robotic arm to which the holding mechanism and the pressing mechanism are attached;
a control device configured to control operation of the robot body; and
a frame jig fixedly installed and conforming to a shape of the bottom board of the box, wherein:
while the holding mechanism holds the box material in a state where the bottom board and the four side boards are in a flat board shape, the holding mechanism places the box material on the frame jig, and
the pressing mechanism presses from above against the bottom board of the box material disposed on the frame jig to fold the side boards with respect to the bottom board at score lines.

7. A box assembly device configured to assemble a box material having a bottom board and four side boards continuously provided via score lines to the bottom board, the box assembly device comprising:
a robot body having a holding mechanism configured to hold the box material, a pressing mechanism configured to press against the box material, and a robotic arm to which the holding mechanism and the pressing mechanism are attached;

a control device configured to control operation of the robot body; and a frame jig fixedly installed and conforming to a shape of the bottom board of the box, wherein:

while the holding mechanism holding the box material in a state where the bottom board and the four side boards are developed in a flat board shape, the holding mechanism places the box material on the frame jig, the pressing mechanism presses from above against the bottom board of the box material disposed on the frame jig to fold the side boards with respect to the bottom board at score lines, the pressing mechanism includes:

a first surface part configured to press against the box material from above; and a second surface part configured to press against the box material from a side direction, the first surface part is pressed from above against the bottom board of the box material disposed on the frame jig to fold the side board upwardly with respect to the bottom board at the score line to form the bottom of the box, the second surface part is pressed from the side direction against the side board folded upwardly with respect to the bottom board at the score line to fold the side board inside, and the first surface part is pressed from above against the side board folded inwardly to fold the side board downwardly toward the bottom board to form a side part of the box.

8. A method of assembling a box by a box assembly device configured to assemble the box from a box material having a bottom board and four side boards continuously provided via score lines to the bottom board, the box assembly device including:

a robot body having a holding mechanism configured to hold the box material, a pressing mechanism configured to press against the box material, and a robotic arm to which the holding mechanism and the pressing mechanism are attached;

a control device configured to control operation of the robot body; and a frame jig fixedly installed and conforming to a shape of the bottom board of the box, the method of assembling the box comprising:

while holding, by the holding mechanism, the box material in a state where the bottom board and the four side boards are in a flat board shape, the holding mechanism places the box material on the frame jig, and pressing, by the pressing mechanism, from above against the bottom board of the box material disposed on the frame jig to fold the side boards with respect to the bottom board at the score lines to form the bottom of the box.

* * * * *